United States Patent
Murata et al.

(10) Patent No.: US 9,728,211 B1
(45) Date of Patent: Aug. 8, 2017

(54) SUSPENSION PAD FOR HEAD-GIMBAL ASSEMBLY THAT INHIBITS FORMATION OF AN INTER-PAD SOLDER BRIDGE

(71) Applicant: HGST Netherlands B.V., Amsterdam (NL)

(72) Inventors: Kenichi Murata, Ebina (JP); Yuhsuke Matsumoto, Fujisawa (JP); Masafumi Umeda, Fujisawa (JP); Hiroyasu Tsuchida, Fujisawa (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/016,149

(22) Filed: Feb. 4, 2016

(51) Int. Cl.
*G11B 5/48* (2006.01)
(52) U.S. Cl.
CPC .......... *G11B 5/4826* (2013.01); *G11B 5/4846* (2013.01)
(58) Field of Classification Search
CPC .................................................... G11B 5/4846
USPC ........................................................ 360/234.5
See application file for complete search history.

(56) References Cited

U.S. PATENT DOCUMENTS

| | | | |
|---|---|---|---|
| 7,450,346 B2 | 11/2008 | Arya et al. | |
| 8,213,121 B2 | 7/2012 | Dela Pena et al. | |
| 8,259,415 B2 | 9/2012 | Hutchinson et al. | |
| 8,477,457 B2 | 7/2013 | Matsumoto et al. | |
| 8,587,901 B1 * | 11/2013 | Puttichaem | G11B 5/4826 360/234.5 |
| 8,705,324 B2 | 4/2014 | Shivarama et al. | |
| 8,810,965 B2 | 8/2014 | Peng et al. | |
| 8,934,201 B1 * | 1/2015 | Feng | G11B 5/4846 360/264.2 |
| 9,025,283 B1 | 5/2015 | Puttichaem et al. | |
| 9,171,562 B1 * | 10/2015 | Puttichaem | G11B 5/4866 |
| 2005/0199680 A1 * | 9/2005 | Matsumoto | H05K 1/111 228/101 |
| 2006/0139809 A1 * | 6/2006 | Matsumoto | G11B 5/4826 360/234.5 |
| 2007/0047144 A1 | 3/2007 | Oosawa | |
| 2008/0088975 A1 * | 4/2008 | Bennin | G11B 5/4846 360/234.5 |
| 2010/0020446 A1 * | 1/2010 | Dunn | G11B 5/4833 360/245.8 |
| 2010/0321829 A1 * | 12/2010 | Hutchinson | G11B 5/4853 360/234.5 |

* cited by examiner

*Primary Examiner* — Jefferson Evans
(74) *Attorney, Agent, or Firm* — Foley & Lardner LLP (57) ABSTRACT

Devices including a suspension pad shape and layout that avoids shorts caused by solder bridging during coupling of leads thereto. One embodiment includes a plurality of slider pads and a plurality of suspension pads being generally aligned with the slider pads. A conductive material electrically couples each of the suspension pads to the slider pad aligned therewith. At least one of the suspension pads is characterized as follows. The suspension pad has a proximal edge positioned closest to the associated slider pad, a distal edge positioned opposite the proximal edge, and side edges extending between the proximal and distal edges. At least a portion of the suspension pad tapers toward the proximal edge.

20 Claims, 8 Drawing Sheets

SUSPENSION PAD FOR HEAD-GIMBAL ASSEMBLY THAT INHIBITS FORMATION OF AN INTER-PAD SOLDER BRIDGE

FIELD OF THE INVENTION

The present invention relates to data storage systems, and more particularly, this invention relates to a pad design that inhibits formation of inter-pad solder bridges.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meet this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles.

Moreover, the addition of electrical contact pads to a slider to enable such technologies as Heat Assisted Magnetic Recording (HAMR), Microwave Assisted Magnetic Recording (MAMR), and others have led to a high density of electrical pads in close proximity. This in turn creates problems such as increasing the likelihood of a short between adjacent pads, especially when using solder.

SUMMARY

A system according to one embodiment includes a plurality of slider pads, a plurality of suspension pads generally aligned with the slider pads, and a conductive material electrically coupling each of the suspension pads to the slider pad aligned therewith. At least one of the suspension pads is characterized as follows. The suspension pad has a proximal edge positioned closest to the associated slider pad, a distal edge positioned opposite the proximal edge, and side edges extending between the proximal and distal edges. At least a portion of the suspension pad tapers toward the proximal edge, the tapered portion of the suspension pad being defined between "taper portions" of the side edges.

A product according to one embodiment includes a plurality of suspension pads arranged along a substrate. At least one of the suspension pads is characterized as follows. The suspension pad has a proximal edge for positioning closest to an expected position of a first slider pad to be electrically coupled to the suspension pad, a distal edge positioned opposite the proximal edge, and side edges extending between the proximal and distal edges. At least a portion of the suspension pad tapers toward the proximal edge.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Particularly, various embodiments implement uniquely shaped suspension pads that inhibit formation of solder bridges, thereby preventing shorting on electronics such as HGAs.

In one general embodiment, a system includes a plurality of slider pads, a plurality of suspension pads generally aligned with the slider pads, and a conductive material electrically coupling each of the suspension pads to the slider pad aligned therewith. At least one of the suspension pads is characterized as follows. The suspension pad has a proximal edge positioned closest to the associated slider pad, a distal edge positioned opposite the proximal edge, and side edges extending between the proximal and distal edges. At least a portion of the suspension pad tapers toward the proximal edge.

In another general embodiment, a product includes a plurality of suspension pads arranged along a substrate. At least one of the suspension pads is characterized as follows. The suspension pad has a proximal edge for positioning closest to an expected position of a first slider pad to be electrically coupled to the suspension pad, a distal edge positioned opposite the proximal edge, and side edges extending between the proximal and distal edges. At least a portion of the suspension pad tapers toward the proximal edge.

Figure 1:
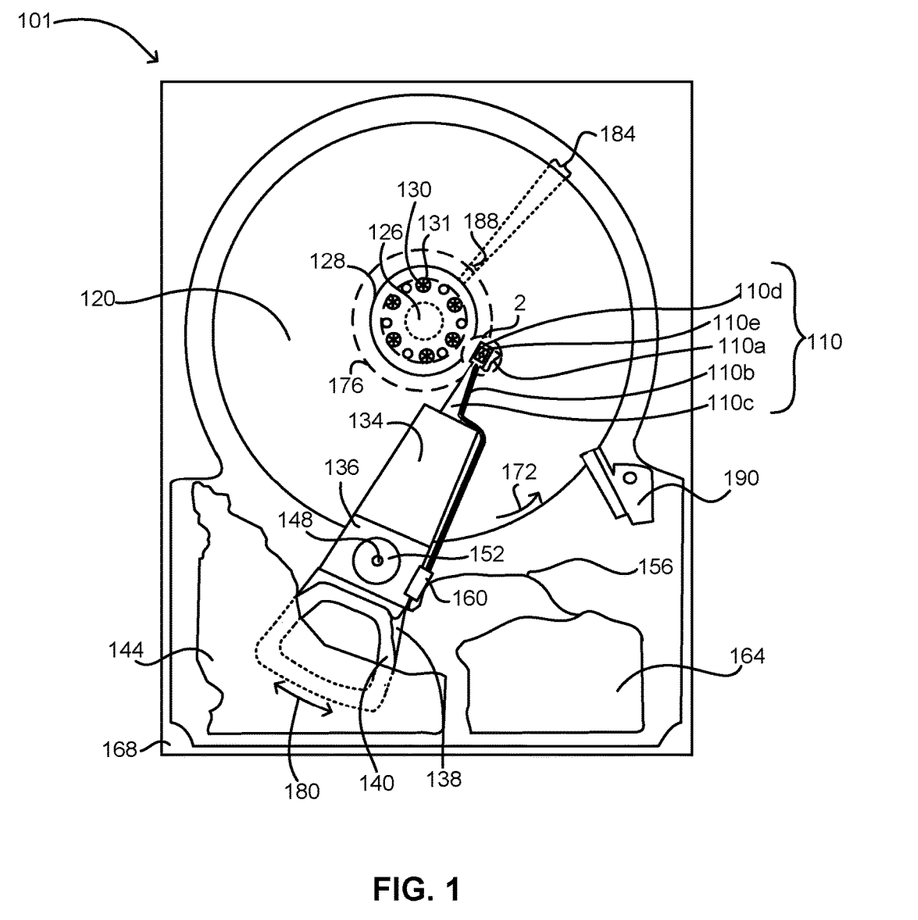
FIG. 1 is a drawing of a magnetic disk drive system, according to one embodiment.

With reference now to FIG. 1, in accordance with various embodiments of the present invention, a plan view of a hard-disk drive (HDD) 101 is shown. HDD 101 includes a HGA 110 with a suspension pad, for example, suspension pad 220 (see FIG. 2), having a form that is configured to inhibit formation of an inter-pad solder bridge HDD 101 includes at least one such HGA 110. The HGA 110 includes a gimbal 110e, a slider 110a, and a plurality of suspension pads 220 (see FIG. 2). The slider 110a includes a magnetic head, typically at a distal end thereof. The magnetic head may include one or more transducers, such as a magnetic reader, a magnetic writer, a near field transducer for heating the magnetic-recording disk 120, etc. HGA 110 further includes a suspension 110b attached to the slider 110a. The slider 110a is attached at the distal end of the load beam 110c via a gimbal 110e, which is attached to the load beam 110e. The HGA 110 may also include a tongue 110d, which is used in loading and unloading the slider 110a from a load-unload ramp structure 190.

HDL) 101 also includes at least one magnetic-recording disk 120 rotatably mounted on a spindle 126 and a drive mechanism such as a spindle motor (not shown) mounted in a disk-enclosure base 168 and attached to the spindle 126 for rotating the magnetic-recording disk 120. The magnetic-recording disk 120, or a plurality (not shown) of magnetic-recording disks, may be affixed to the spindle 126 with a disk clamp 128. The disk clamp 128 is provided with fastener holes, for example, fastener hole 130, and clamps the magnetic-recording disk 120, or magnetic recording disks (not shown), to a hub (not shown) with fasteners, of which fastener 131 is an example.

HDD 101 further includes an actuator arm 134 attached to HGA 110, a carriage 136, a voice-coil motor (VCM) that includes an armature 138 including a voice coil 140 attached to the carriage 136; and a stator 144 including a voice-coil magnet (not shown); the armature 138 of the VCM is attached to the carriage 136 and is configured to move the actuator arm 134 and HGA 110 to access portions of the magnetic-recording disk 120, as the carriage 136 is mounted on a pivot-shaft 148 with an interposed pivot-bearing assembly 152.

With further reference to FIG. 1, in accordance with one or more embodiments of the present invention, electrical signals, for example, current to the voice coil 140 of the VCM, and write signals to and read signals from the magnetic-recording head of the slider 110a, are provided by a flexible cable 156, Interconnection between the flexible cable 156 and the magnetic-recording head may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by the disk-enclosure base 168. The disk-enclosure base 168, in conjunction with an HDD cover (not shown), provides a sealed protective disk enclosure for the information storage components of HDD 101.

With further reference to FIG. 1, in accordance with one or more embodiments, other electronic components (not shown), including a disk controller and servo electronics including a digital-signal processor (DSP), provide electrical signals to the spindle motor, the voice coil 140 and the slider 110a. The electrical signal provided to the spindle motor enables the spindle motor to spin providing a torque to the spindle 126 which is in turn transmitted to the magnetic-recording disk 120 that is affixed to the spindle 126 by the disk clamp 128; as a result, the magnetic-recording disk 120 spins in direction 172. The spinning magnetic-recording disk 120 creates an airflow thereabove, and a self-acting air bearing on which the media facing side, also referred to as an air-bearing surface (ABS), of the slider 110a rides so that the slider 110a flies in proximity with the recording surface of the magnetic-recording disk 120. The electrical signal provided to the voice coil 140 of the VCM enables the magnetic-recording head of the slider 110a to access a track 176 on which information is recorded. As used herein, "access" is a term of art that refers to operations in seeking the track 176 of the magnetic-recording disk 120 and positioning the magnetic-recording head on the track for both reading data from, and writing data to, the magnetic-recording disk 120. The armature 138 of the VCM swings through an arc 180 which enables HGA 110 attached to the armature 138 by the actuator arm 134 to access various tracks on the magnetic-recording disk 120, Information is typically stored on the magnetic-recording disk 120 in a plurality of concentric tracks (not shown) arranged in sectors on the magnetic-recording disk 120, for example, sector 184. Correspondingly, each track 176 is composed of a plurality of sectored track portions, for example, sectored track portion 188. Each sectored track portion 188 may include recorded data and a header containing a servo-burst-signal pattern, for example, an ARCD-servo-burst-signal pattern, information that identifies the track 176, and error correction code information. In accessing the track 176, the read element of the magnetic-recording head reads the servo-burst-signal pattern which provides a position-error-signal (PES) to the servo electronics, which controls the electrical signal provided to the voice coil 140 of the VCM, enabling the magnetic-recording head to follow the track 176. Upon finding the track 176 and identifying a particular sectored track portion 188, the magnetic-recording head may read data from the track 176, write data to the track 176, or both, depending on instructions received by the disk controller from an external agent, for example, a processor of a computer system.

Also as shown in FIG. 1, a reference circle 2 is provided to indicate the portion of the HGA 110 subsequently described in the discussion of FIG. 2.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

Except as otherwise described herein with reference to the various inventive embodiments, the various components of the structures of FIG. 1, and of other embodiments disclosed herein, may be of conventional material(s), design, and/or fabricated using conventional techniques, as would become apparent to one skilled in the art upon reading the present disclosure.

Figure 2:
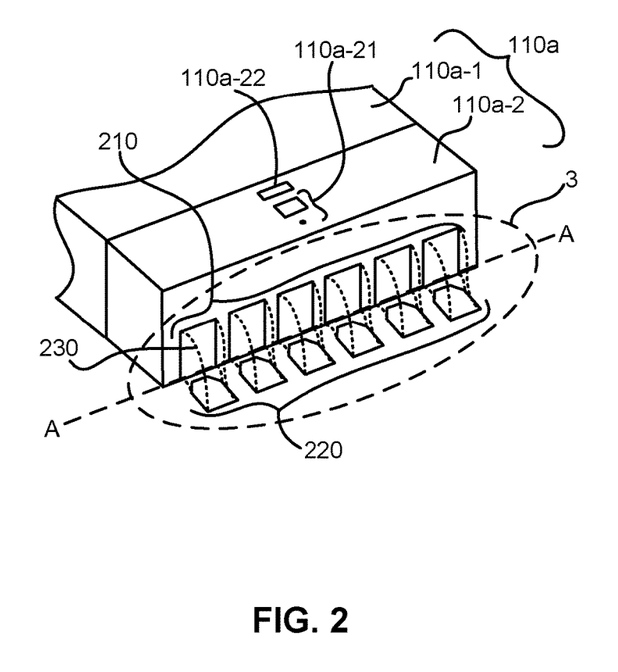
FIG. 2 is an enlarged perspective view of the portion of the Head-Gimbal Assembly (HGA) enclosed by circle 2 of FIG. 1.

FIG. 2 is an enlarged perspective view of the portion of the HGA enclosed by circle 2 of FIG. 1, detailing a plurality of suspension pads in communication with a plurality of head-slider pads at the trailing edge of the slider joined together in pairs by a plurality of solder bonds without the formation of inter-pad solder bridges, in accordance with one or more embodiments.

FIG. 2 shows in detail a plurality of suspension pads 220 generally aligned with and in communication with a plurality of slider pads 210 at the trailing edge of the slider 110a joined together in pairs by a plurality of bonds of conductive material, e.g., solder bonds 230 without the formation of inter-pad solder bridges. A line on either side of which the plurality of suspension pads 220 and the plurality of slider pads 210 are about symmetrically arranged for interconnection is indicated by line A-A. As shown in FIG. 2, the slider 110a includes a magnetic head 110a-2 coupled with the slider body 110a-1, and a plurality of slider pads 210. The magnetic head 110a-2 may include a write element 110a-21 configured for writing data to a magnetic-recording disk, and/or a read element 110a-22 configured for reading data from the magnetic-recording disk. Each of the suspension pads 220 is coupled with an associated slider pad 210 by a respective solder bond 230.

Except where otherwise specified, the various component parts of system 101 may be of conventional construction and/or design, and fabricated using conventional processes and techniques.

Note that FIG. 2 shows six suspension/slider pad pairs. As noted above, the number of connections between a magnetic head and the suspension is increasing as new technology such as MAMR and MIMO are introduced. Consequently, the spacing between neighboring pads becomes narrow, resulting in solder bridge failure due to formation of inter-pad solder bridging between adjacent pads.

Accordingly, various embodiments presented herein include suspension pads 220 having a shape that inhibits formation of solder bridging with laterally adjacent pads when used in conjunction with conventional solder ball coupling. Moreover, counterintuitively, the proposed suspension pads 220 result in formation of fewer solder bridges than narrower suspension pads having greater pad-to-pad spacing therebetween.

Figure 3:
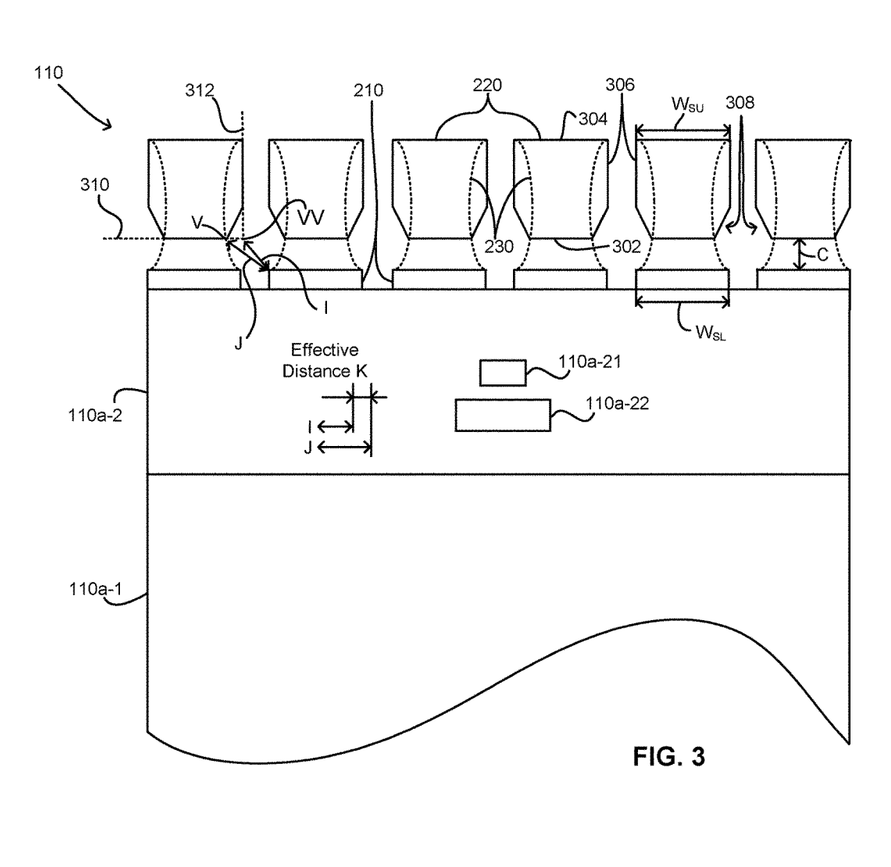
FIG. 3 is a top-down view of a plurality of slider pads and a plurality of suspension pads taken from circle 3 of FIG. 2.

Referring to FIG. 3, there is shown a top-down view, taken from circle 3 of FIG. 2, of a plurality of slider pads 210 and a plurality of suspension pads 220 that are generally aligned with the slider pads. The conductive material electrically coupling each of the slider pads to the slider pad aligned therewith is shown in the path indicated by the curved dotted lines. Again, while six pairs of pads are shown, the number of pairs of pads may be higher or lower. For example, various embodiments may have 8, 10, 12, 14, or more pairs of pads.

At least one of the suspension pads, and preferably all of the suspension pads, are characterized as having the following features. In an exemplary embodiment shown, each suspension pad has a proximal edge 302 positioned closest to the associated slider pad aligned therewith, a distal edge 304 positioned opposite the proximal edge, and side edges 306 extending between the proximal and distal edges. At least a portion of the suspension pad tapers toward the proximal edge 302. For example, at least one, and preferably both, of the side edges of the suspension pad has a taper portion 308 along the portion of the suspension pad, thereby defining a portion of the suspension pad that tapers toward the proximal edge 302. As discussed in more detail below, the tapering may include straight sections, bending or curving sections, stepped sections, and combinations thereof. There may be no change in width of the slider pad 210 therealong.

In preferred embodiments, a vertex V is defined along the taper portion of one or both side edges that define the tapered portion of the suspension pad, the vertex being a point along the side edge (taper portion) positioned closest to a second of the slider pads that is positioned diagonally from the suspension pad, and positioned immediately adjacent the slider pad that is aligned with the suspension pad. A first distance J is defined between the vertex and the nearest point on the second slider pad.

A virtual vertex VV is defined at an intersection of perpendicular imaginary lines 310, 312 extending along the proximal edge and the side edge closest to the second slider pad, respectively. A second distance I is defined from the virtual vertex to the nearest point on the second slider pad. By making the first distance greater than the second distance (J>I), formation of solder bridging to laterally adjacent pads is inhibited, especially when using conventional solder ball coupling to form the conductive path between the orthogonally-oriented faces of the pads. If the extrusion is large, as seen when distance J is not larger but equal to distance I, then the molten solder ball is at risk of touching the adjacent suspension pad thereby causing a solder short connection.

Preferably, effective distance K defined as the difference between the distance J and the distance I is at least 15% of a smallest width ($W_{SL}$) of the associated slider pad, and preferably at least 15% of a smallest width of the smallest slider pad. In another approach, a difference between the first distance and the second distance is at least 15% of a width between the vertex and a second vertex of the suspension pad positioned along the side edge opposite the vertex.

Without wishing to be bound by any theory, it is believed that addition of taper portions to one or both side edges of the suspension pads near the proximal edge thereof reduces the maximum amount of lateral solder extrusion upon application of the molten solder ball to the pads.

Figure 4:
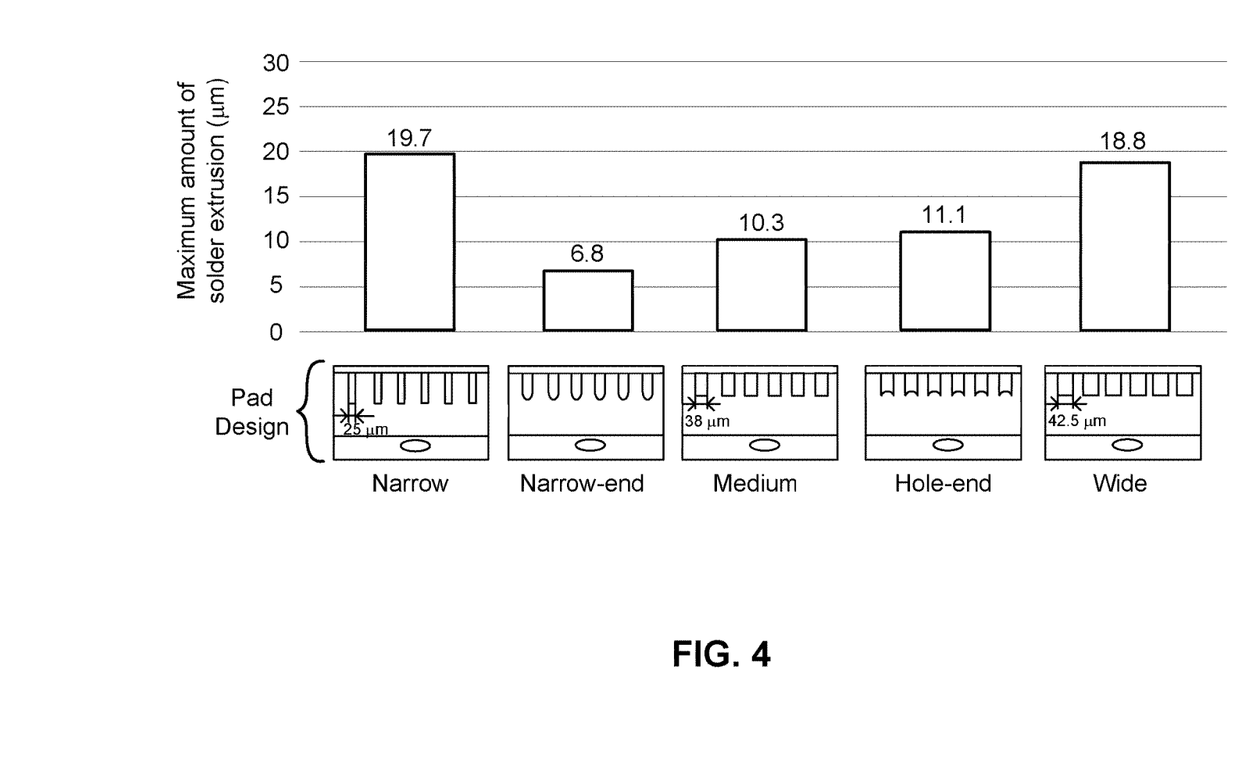
FIG. 4 is a chart depicting various suspension pad designs and results of an experiment using the suspension pad designs.

Moreover, referring to FIG. 4, while performing experimentation to confirm the foregoing, the inventors surprisingly found that using suspension pads having the aforementioned J>I distance relationship resulted in the lowest maximum solder extrusion of the designs studied under otherwise identical conditions. This result was not expected or predictable. Rather, the inventors expected the "Wide," "Narrow-end" and "Hole-end" designs (FIG. 4) to mitigate the solder extrusion to eliminate solder bridging. In contrast, what they found was that the Narrow-end design provided a significantly lower solder extrusion than any other design. Narrow-end suspension pad design performed best from the view point of solder extrusion. These observations were obtained by high speed camera that documented the extrusion of molten solder when the molten solder landed on the suspension pad.

FIG. 4 sets forth the suspension pad designs and results of the aforementioned experiment. In the experiment, an identical solder ball deposition process was performed on various suspension pad designs, while the slider pad design was the same in all runs. As shown, the various pad designs tested were Narrow, Narrow-end, Medium, Hole-end, and Wide. As shown in the chart above the designs in FIG. 4, the Narrow-end having the J>I distance relationship resulted in the lowest maximum amount of solder extrusion, which is defined as the maximum extent that the edge of the solder extends laterally beyond the side edge of the pad on which it is extruded at any point during the solder ball deposition process.

Referring again to FIG. 3, in the example shown, a distance C is defined as the clearance between the proximal edge 302 of each suspension pad 220 and the slider pad 210 aligned therewith, measured in a direction parallel to a plane of deposition of the suspension pad. The distance C is greater than 0 mm in some approaches. In other embodiments, one or more of the suspension pads may extend to and/or below the slider pad. In other words, the clearance C is zero or negative, e.g., as shown in FIGS. 5A and 5B.

Figure 5A:
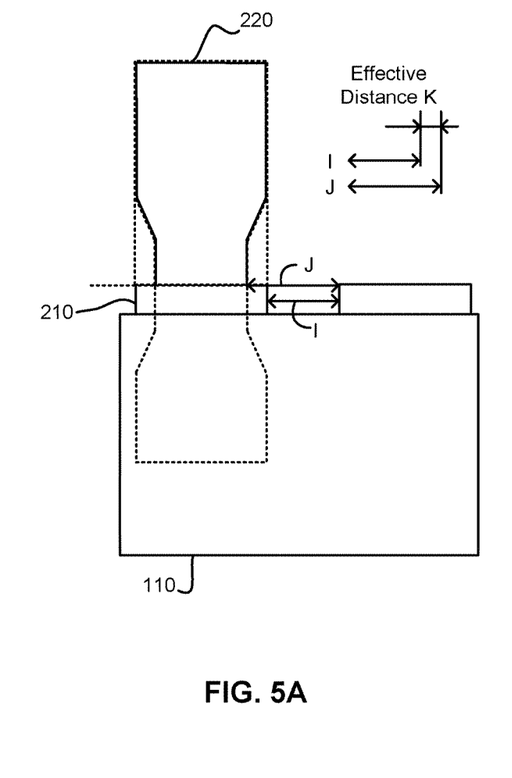
FIG. 5A is a top-down view of the slider pad and a suspension pad which extends below the bottom of the slider according to one embodiment.
Figure 5B:
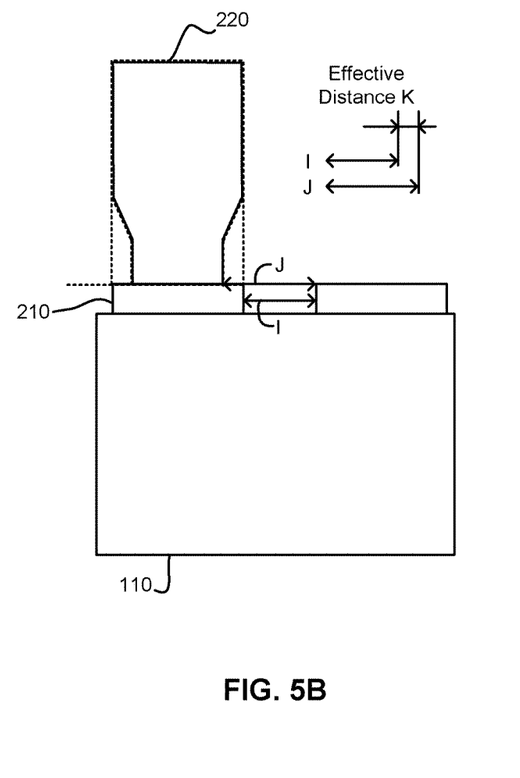
FIG. 5B is a top-down view of a suspension pad that extends to the proximal edge of the slider pad according to one embodiment.

FIGS. 5A and 5B depict alternate embodiments. As an option, the present embodiments may be implemented in conjunction with features from any other embodiment listed herein, such as those described with reference to the other FIGS. Of course, however, such embodiments and others presented herein may be used in various applications and/or in permutations which may or may not be specifically described in the illustrative embodiments listed herein. Further, the embodiments presented herein may be used in any desired environment.

FIG. 5A depicts an embodiment where the suspension pad 220 extends below the slider pad 210. FIG. 5B depicts an embodiment where the suspension pad 220 extends to the edge of the slider pad 210. In both FIGS. 5A and 5B, a first distance J is defined from the vertex as shown as the corner of the suspension pad 220 where the suspension pad edge meets the edge of the slider pad 210 to the nearest point on the second slider pad. A second distance I is defined from the virtual vertex to the nearest point on the second slider pad. Effective distance K is defined as difference between first distance J and second distance I wherein the first distance is greater than the second distance (J>I).

Referring to FIGS. 3, 5A and 5B, the width $W_{SU}$ of the distal end of the suspension pad is preferably as wide or wider than the slider pad, though could be slightly narrower than the corresponding slider pad, as long as the proper relationship between the first and second distances I, J is maintained (J>I).

Figure 6:
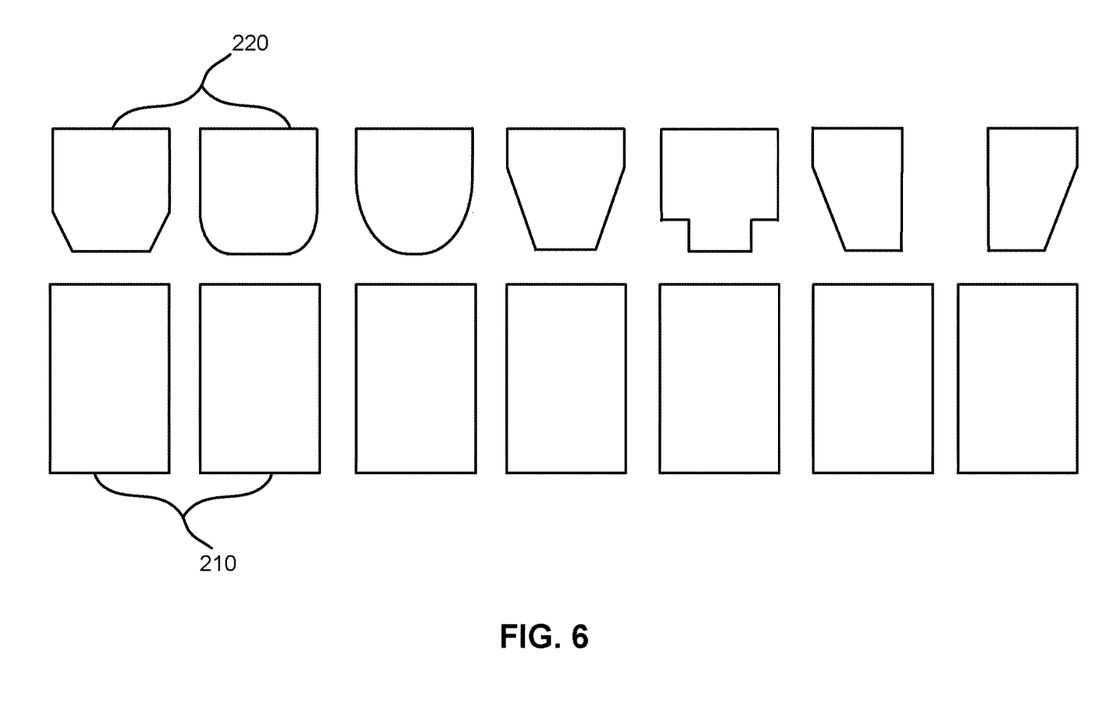
FIG. 6 is a representative view showing various suspension pad designs according to various embodiments.

As shown in FIG. 3, all of the suspension pads have the same shape in that exemplary embodiment. Note that the particular shape of the suspension pad may vary from that shown in FIG. 3. For example, the tapering of the suspension pads may include straight sections, bending or curving sections, stepping sections, and combinations thereof. FIG. 6 illustrates some of the possible shapes that may be implemented in various embodiments. Accordingly, various approaches may include arrays of suspension pads having a profile (shape) similar to any of those shown in FIG. 6, or other shapes providing the proper relationship between the first and second distances I, J.

Moreover, while all of the suspension pads may have similar profiles in some approaches, various embodiments may have suspension pads in various combinations of different shapes, e.g., a combination of the profiles shown in FIG. 6. In one example, two different profiles may be arranged in an alternating fashion such that every other suspension pad may have one or both taper portions while the alternating suspension pads may be more rectangular. Thus, any combination of suspension pad shapes may be used in the various permutations and variations of embodiments.

Figure 7:
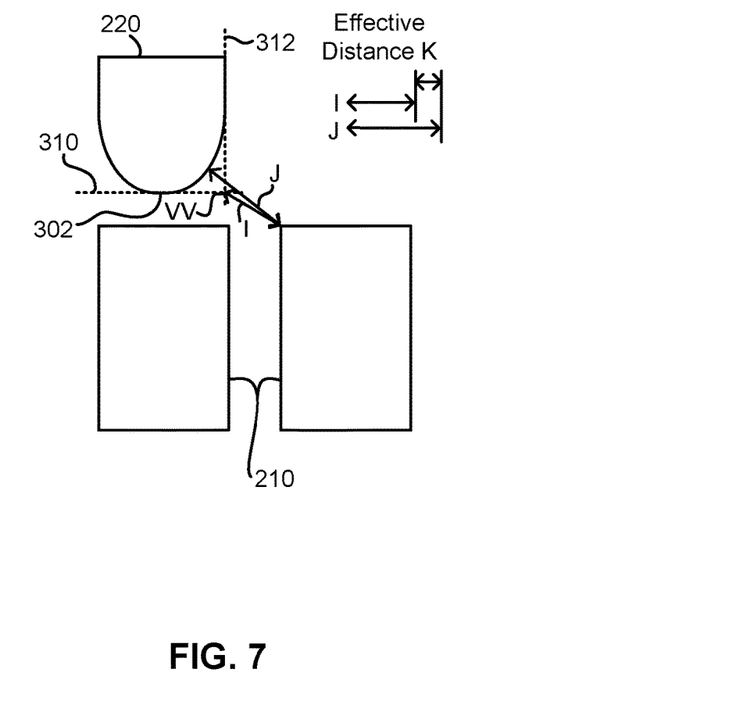
FIG. 7 is a representative view illustrating the distance relationship of a shaped suspension pad to the adjacent slider pad according to one embodiment.

FIG. 7 depicts a shape profile of a suspension pad in accordance with one embodiment. As an option, the present shape profile may be implemented in conjunction with features from any other embodiment listed herein, such as those described with reference to the other FIGS. 2-6. Of course, however, such a shape profile of a suspension pad and others presented herein may be used in various applications and/or in permutations which may or may not be specifically described in the illustrative embodiments listed herein. Further, the shape profile of a suspension pad presented herein may be used in any desired environment.

The vertex of the suspension pad 220 shown in FIG. 7 is defined as the point along the curve or stepped portion between the side edges along line 312 and the proximal edge 302 that is nearest to the expected position of the second slider pad 210, such that the first distance J is defined between the vertex and the nearest point of the expected position of the second slider pad 210. The second distance I is defined from the virtual vertex VV, at the intersection of imaginary lines 310, 312, to the nearest point of the expected position of the second slider pad such that the first distance is greater than the second distance (J>I).

The suspension pads and slider pads may be constructed of any suitable conductive material. Illustrative materials include, but are not limited to, gold, copper, nickel, and aluminum. The solder may be of a type known in the art.

Figure 8:
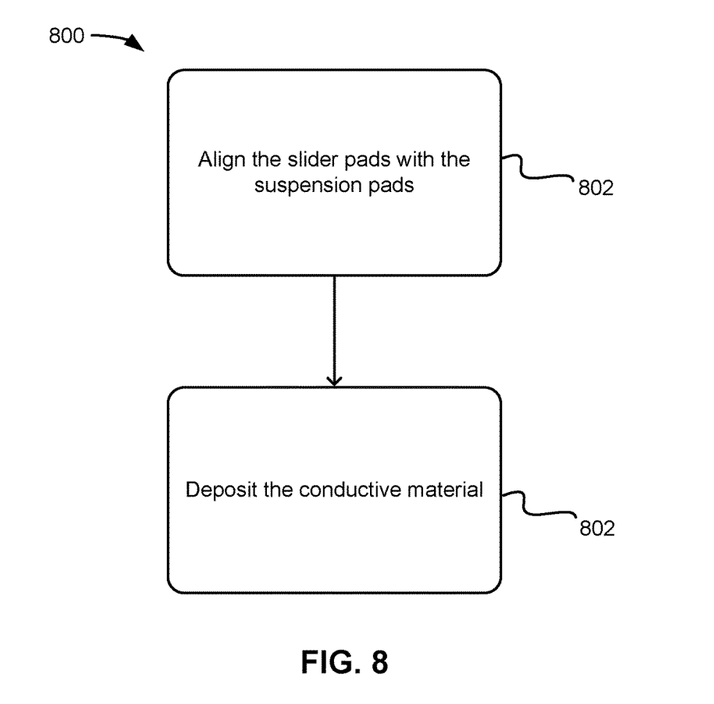
FIG. 8 is a flow chart of a method of forming a magnetic data storage system according to one embodiment.

FIG. 8 shows a method 800 for forming a magnetic data storage system, in accordance with various embodiments. As an option, the present method 800 may be implemented to construct structures such as those shown in FIGS. 1-7. Of course, however, this method 800 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

With reference to FIG. 8, operation 802 includes aligning the slider pads with the suspension pads using known techniques, followed by depositing the conductive material in operation 804. A preferred embodiment includes depositing a conductive material such as solder by solder ball deposition.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a plurality of slider pads;
   a plurality of suspension pads being generally aligned with the slider pads; and
   a conductive material electrically coupling each of the suspension pads to the slider pad aligned therewith,
   at least one of the suspension pads being characterized as follows:
      the suspension pad having a proximal edge positioned closest to the associated slider pad, a distal edge positioned opposite the proximal edge, and side edges extending between the proximal and distal edges,
      wherein at least a portion of the suspension pad tapers toward the proximal edge, and
      wherein a first vertex is defined along a point of the side edge positioned closest to a second of the slider pads that is positioned immediately adjacent the slider pad aligned with the suspension pad, wherein a first distance is defined between the vertex and the second slider pad, wherein a virtual vertex is defined at an intersection of perpendicular lines extending along the proximal edge and the side edge closest to the second slider pad, wherein a second distance is defined from the virtual vertex to the second slider pad, wherein the first distance is greater than the second distance, and
      wherein a difference between the first distance and the second distance is at least 15% of a smallest width of the slider pad associated with the suspension pad.

2. The system as recited in claim 1, wherein both side edges of the at least one suspension pad have taper portions that approach one another toward the proximal edge.

3. The system as recited in claim 2, wherein each side edge is straight therealong between the proximal and distal side edges.

4. The system as recited in claim 2, wherein each side edge is stepped.

5. The system as recited in claim 2, wherein each side edge is curved.

6. The system as recited in claim 1, wherein a distance between the proximal edge of the at least one suspension pad and the slider pad aligned therewith, measured in a direction parallel to a plane of deposition of the suspension pad, is greater than 0.

7. The system as recited in claim 1, wherein the at least one suspension pad extends to or below the associated slider pad.

8. The system as recited in claim 1, further comprising:
   a magnetic medium;
   a drive mechanism for passing the magnetic medium over the slider pads and suspension pads; and
   a controller electrically coupled to the suspension pads.

9. A method of forming the system of claim 1, comprising:
   aligning the slider pads with the suspension pads; and
   depositing the conductive material.

10. The method as recited in claim 9, wherein the conductive material is solder, wherein the solder is deposited by solder ball deposition.

11. A system, comprising:
    a plurality of slider pads;
    a plurality of suspension pads being generally aligned with the slider pads; and
    a conductive material electrically coupling each of the suspension pads to the slider pad aligned therewith,
    at least one of the suspension pads being characterized as follows:
       the suspension pad having a proximal edge positioned closest to the associated slider pad, a distal edge positioned opposite the proximal edge, and side edges extending between the proximal and distal edges,
       wherein at least a portion of the suspension pad tapers toward the proximal edge,
       wherein a vertex is defined along a point of the side edge positioned closest to a second of the slider pads that is positioned immediately adjacent the slider pad aligned with the suspension pad, wherein a first distance is defined between the vertex and the second slider pad, wherein a virtual vertex is defined at an intersection of perpendicular lines extending along the proximal edge and the side edge closest to the second slider pad, wherein a second distance is defined from the virtual vertex to the second slider pad, wherein the first distance is greater than the second distance, and
       wherein a difference between the first distance and the second distance is at least 15% of a width between the vertex and a second vertex of the suspension pad positioned along the side edge opposite the vertex.

12. The system as recited in claim 11, wherein the conductive material is solder.

13. The system as recited in claim 11, wherein the conductive material extends from faces of the slider pads that are oriented orthogonally to faces of the suspension pads.

14. The system as recited in claim 11, wherein the side edge positioned closest to a second of the slider pads is straight.

15. The system as recited in claim 11, wherein the side edge positioned closest to a second of the slider pads is stepped.

16. The system as recited in claim 11, wherein the side edge positioned closest to a second of the slider pads is curved.

17. A product, comprising:
a plurality of suspension pads arranged along a substrate, at least one of the suspension pads being characterized as follows:
the suspension pad having a proximal edge for positioning closest to an expected position of a first slider pad to be electrically coupled to the suspension pad, a distal edge positioned opposite the proximal edge, and side edges extending between the proximal and distal edges,
wherein at least a portion of the suspension pad tapers toward the proximal edge,
wherein a vertex is defined along a point of the side edge positioned closest to the expected position of a second slider pad positioned immediately adjacent the expected position of the first slider pad, wherein a first distance is defined between the vertex and the expected position of the second slider pad, wherein a virtual vertex is defined at an intersection of perpendicular lines extending along the proximal edge and the side edge closest to the expected position of the second slider pad, wherein a second distance is defined from the virtual vertex to the expected position of the second slider pad, wherein the first distance is greater than the second distance, and
wherein a difference between the first distance and the second distance is at least 15% of a width between the vertex and a second vertex of the suspension pad positioned along the side edge opposite the vertex.

18. The product as recited in claim 17, wherein the side edge positioned closest to the expected position of the second slider pad is at least one of straight, stepped and curved.

19. The product as recited in claim 17, wherein both side edges of at least some of the suspension pads have taper portions that approach one another toward the proximal edge.

20. The product as recited in claim 17, further comprising:
a magnetic medium;
a slider having slider pads electrically coupled to the suspension pads;
a drive mechanism for passing the magnetic medium over the slider; and
a controller electrically coupled to the suspension pads.

* * * * *